United States Patent [19]
Kawamura et al.

[11] Patent Number: 5,613,857
[45] Date of Patent: Mar. 25, 1997

[54] WATERPROOF CONSTRUCTION OF WIRING HARNESS

[75] Inventors: Takao Kawamura; Haruhiro Muto, both of Yokkaichi, Japan

[73] Assignee: Sumitomo Wiring Systems, Ltd., Yokkaichi, Japan

[21] Appl. No.: 568,521

[22] Filed: Dec. 7, 1995

Related U.S. Application Data

[63] Continuation of Ser. No. 297,939, Aug. 31, 1994, abandoned.

[30] Foreign Application Priority Data

Nov. 22, 1993 [JP] Japan .................................. 5-292256

[51] Int. Cl.$^6$ .................................................... H01R 13/52
[52] U.S. Cl. ............................................. 439/34; 439/519
[58] Field of Search ................................. 439/34, 519

[56] References Cited

FOREIGN PATENT DOCUMENTS 4-229961  8/1992  Japan .

OTHER PUBLICATIONS

English Language Abstract of JP 4-229961.

Primary Examiner—Gary F. Paumen
Attorney, Agent, or Firm—Greenblum & Bernstein P.L.C.

[57] ABSTRACT

A waterproof construction of a wiring harness in which a plurality of splicing wires passed through a water immersion area likely to be subjected to water immersion in a motor vehicle and spliced with each other are bundled with other wires, comprising: a terminal which is attached to a distal end of one of the splicing wires; a connector which is disposed at a predetermined position such that the terminal is mounted in a spare terminal pocket of the connector; and a splice portion in which the one of the splicing wires is spliced with the remainder of the splicing wires at a location spaced a predetermined distance from the predetermined position of the connector and disposed in a water nonimmersion area not subjected to water immersion such that the splice portion is disposed in the water nonimmersion area at all times.

4 Claims, 4 Drawing Sheets

WATERPROOF CONSTRUCTION OF WIRING HARNESS

This application is a continuation of application No. 08/297,939, filed Aug. 31, 1994, now abandoned.

BACKGROUND OF THE INVENTION

The present invention generally relates to a waterproof construction of a wiring harness having a splice portion at a water immersion area where water immersion is likely to take place in a motor vehicle and more particularly, to a waterproof construction of a wiring harness, in which the position of the splice portion is improved so as to prevent penetration of water into the wiring harness from the splice portion.

As shown in FIG. 1, a motor vehicle is divided into a cabin side X and an engine side Y and a wiring harness W/H provided between the cabin side X and the engine side Y is mounted, through a grommet 2, in a through-hole of a partition wall 1 between the cabin side X and the engine side Y. A main line W/H-1 of the wiring harness W/H is provided so as to extend from a space S1 above each of wheel wells 3 disposed at opposite sides of an engine compartment ER to a space S2 above a radiator support 4 disposed in front of the engine compartment ER. Meanwhile, branch lines W/H-2 branching off from the main line W/H-1 are chiefly carried into the engine compartment ER via through-holes formed on an outer wall 5 of the engine compartment ER so as to be connected to connectors C1 and C2 disposed in the engine compartment ER and a portion of the branch lines W/H-2 is connected to a waterproof connector C3 disposed outside the engine compartment ER.

In a wiring route of the wiring harness W/H, the space S1 above each of the wheel wells 3 disposed at the opposite sides of the engine room ER and the space S2 above the radiator support 4 disposed in front of the engine room ER are water immersion areas where water immersion is likely to take place, as shown by the hatchings in FIG. 1.

In the above mentioned known wiring harness W/H, in case opposite ends of a wire D1 of the branch line are connected to the connectors C1 and C2 disposed in the engine compartment ER and one end of a wire D2 of the branch line is connected to the connector C3 disposed outside the engine compartment ER such that the wires D1 and D2 are connected to each other by splicing as shown in FIG. 2, its splice portion P of the branch line is disposed in the water immersion area.

In case water penetrates, through a tape wound around an outer periphery of the wiring harness, into the wiring harness in which a group of wires having the splice portion referred to above are bundled and protected, water which has penetrated into the wiring harness is sucked by the splice portion P and is drawn into the connectors C1 to C3 through gaps among the wires, thereby resulting in defective connections or short-circuiting.

In order to solve this problem, a U-shaped portion D1'-1 extending up to the cabin side X in a water nonimmersion area may be provided, through a grommet (not shown), on a wire D1' having opposite ends connected to the connectors C1 and C2, respectively so as to be spliced with a wire D2' connected to the connector C3 such that a splice portion P' of the wires D1' and D2' is formed as shown in FIG. 3. If the known wiring harness is assembled in the water nonimmersion area as shown in FIG. 3 when the splice portion P' of the wires D1' and D2' is bundled with the remaining wires, no problem arises. However, as shown in FIG. 4, such a case may happen in which the wiring harness is assembled in a state where the splice portion P' of the wires D1' and D2' is bundled with the remaining wires in the water immersion area.

In the above described known method in which the U-shaped portion P' is provided on the wire D1' having the opposite ends connected to the connector C1 and C2 so as to be spliced with the wire D2' having one end connected to the connector C3, the position of the U-shaped portion D1'-1 is not regulated. Therefore, such a drawback is incurred that during assembly steps of the wiring harness, the wiring harness should be assembled by paying close attention to direction of the U-shaped portion D1'-1.

SUMMARY OF THE INVENTION

Accordingly, an essential object of the present invention is to provide, with a view to eliminating the above mentioned inconveniences of prior art waterproof constructions of wiring harness, a waterproof construction of a wiring harness, in which a splice portion of the wiring harness is positively disposed in a water nonimmersion area without dependence upon assembly steps of the wiring harness such that penetration of water into the wiring harness from the splice portion can be prevented.

In order to accomplish this object of the present invention, a waterproof construction of a wiring harness in which a plurality of splicing wires passed through a water immersion area likely to be subjected to water immersion in a motor vehicle and spliced with each other are bundled with other wires, according to the present invention comprises: a terminal which is attached to a distal end of one of the splicing wires; a connector which is disposed at a predetermined position such that the terminal is mounted in a spare terminal pocket of the connector; and a splice portion in which the one of the splicing wires is spliced with the remainder of the splicing wires at a location spaced a predetermined distance from the predetermined position of the connector and disposed in a water nonimmersion area not subjected to water immersion such that the splice portion is disposed in the water nonimmersion area at all times.

It is preferable that the connector is disposed at a cabin side in the water nonimmersion area and the splice portion is provided at a location disposed adjacent to a joint portion of the connector and in the water nonimmersion area.

Meanwhile, in case the wire having one end coupled with the connector passes through the water nonimmersion area even if the connector is disposed in the water immersion area, the splice portion may be provided in this water nonimmersion area. Hence, the connector is not necessarily required to be disposed in the water nonimmersion area. However, in this case, the connector disposed in the water nonimmersion area is preferably formed by a waterproof connector.

In the case where the connector is coupled with the wires constituting the wiring harness so as to be disposed at the predetermined position and the wires coupled with the connector pass through the water nonimmersion area surely, the terminal attached to one of the splicing wires is mounted in the spare terminal pocket of the connector and the one of the splicing wires is spliced with the remainder of the splicing wires at the location spaced the predetermined distance from the connector and passing through the water nonimmersion area. As a result, the splice portion is disposed in the water nonimmersion area at all times.

Furthermore, the splice portion is spaced the predetermined distance from the joint portion of the connector. Therefore, when the wiring harness is assembled by bundling the splicing wires and other wires, such an undesirable phenomenon associated with a prior art wiring harness employing a U-shaped portion of FIG. 3 never happens in which the wiring harness is assembled in a state where the splice portion is erroneously disposed in the water immersion area.

BRIEF DESCRIPTION OF THE DRAWINGS

This object and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 5:
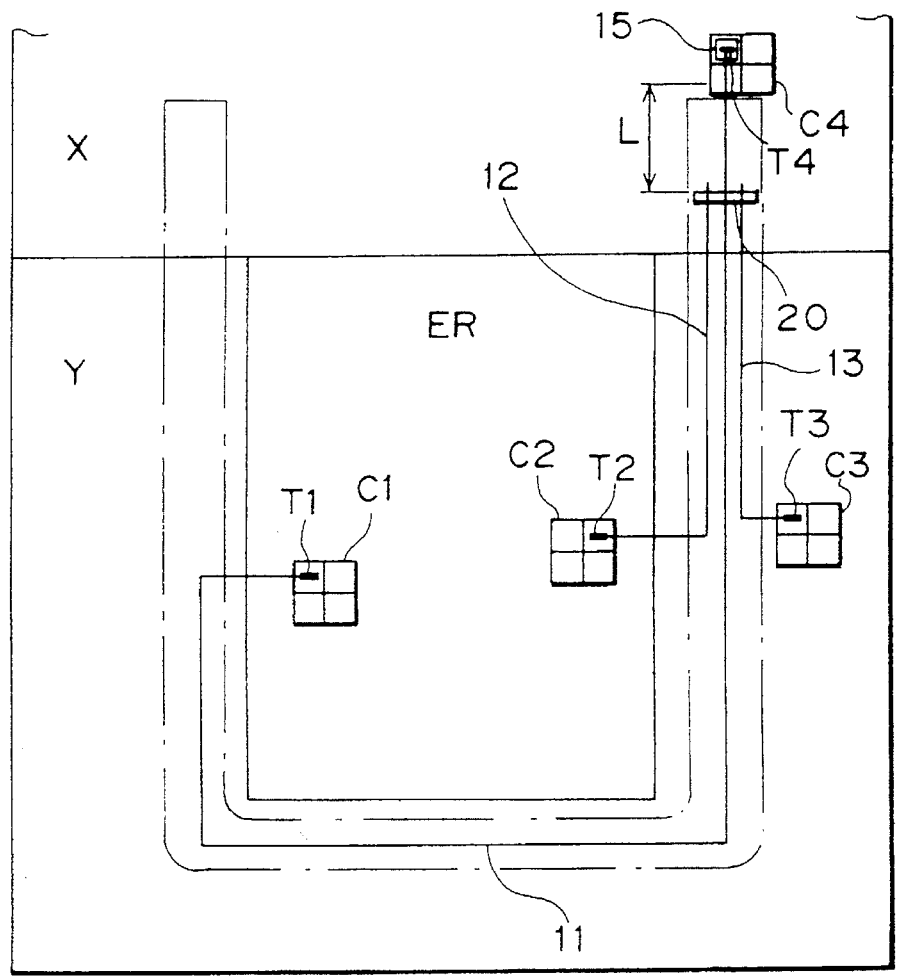
FIG. 5 is a schematic view showing a layout of a wiring harness according to a first embodiment of the present invention.

Referring now to the drawings, there is shown in FIGS. 5 to 8, a wiring harness W/H according to a first embodiment of the present invention. In FIG. 5, a motor vehicle is divided into a cabin side X and an engine side Y. Furthermore, a first terminal T1 of a connector C1 and a second terminal T2 of a connector C2 disposed in an engine compartment ER are connected to each other, while a third terminal T3 of a connector C3 disposed outside the engine room ER is connected to the first and second terminals T1 and T2 referred to above.

Figure 6:
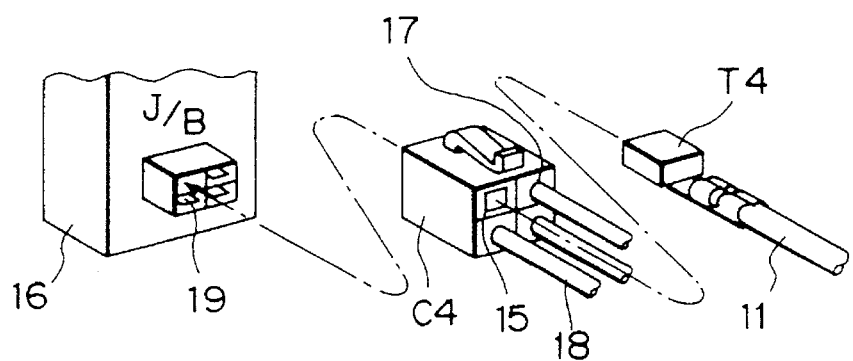
FIG. 6 is a fragmentary exploded perspective view of the wiring harness of FIG. 5.

As shown in FIGS. 5 and 6, one end of a first wire 11 is connected to the first terminal T1 of the connector C1, while a fourth terminal T4 is connected to the other end of the first wire 11. The fourth terminal T4 is accommodated in a spare terminal pocket 15 of a connector C4 disposed at the cabin side X in a water nonimmersion area. The spare terminal pocket 15 means a terminal pocket into which a mating component engageable with the connector C4, i.e., a terminal 19 from a branch joint box 16 in this embodiment is not inserted. Therefore, even if the fourth terminal T4 connected to the other end of the first wire 11 is inserted into the spare terminal pocket 15, the fourth terminal T4 is not connected to the terminal 19. As shown in FIG. 6, terminals connected to other wires 18 constituting the wiring harness W/H are accommodated in other terminal pockets 17 of the connector C4 so as to be connected to the bus bars 19 of the branch joint box 16, respectively.

Figure 7:
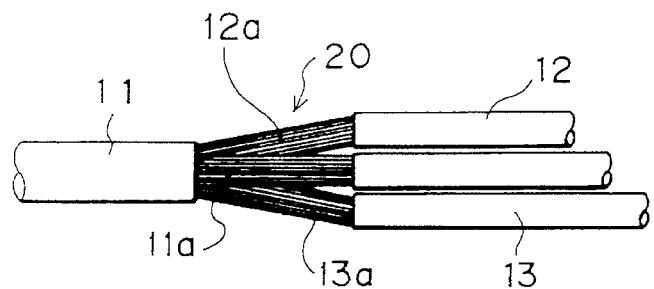
FIG. 7 is an enlarged front elevational view of a splice portion of the wiring harness of FIG. 5.

One end of a second wire 12 is connected to the second terminal T2 of the connector C2 and one end of a third wire 13 is connected to the third terminal T3 of the connector C3. The other end of the second wire 12 and the other end of the third wire 13 are spliced with each other at a location disposed in a water nonimmersion area adjacent to the connector C4 of the first wire 11. Namely, by scalping an intermediate portion of the first wire 11, an end portion of the second wire 12 and an end portion of the third wire 13 as shown in FIG. 7, exposed conductors 11a, 12a and 13a are obtained, respectively so as to be spliced with each other by contact bonding or the like and thus, a splice portion 20 of the first, second and third wires 11, 12 and 13 are obtained. As shown in FIG. 5, the splice portion 20 is spaced a predetermined short distance L from a distal end of the connector C4 so as to be disposed in the water nonimmersion area.

Figure 8:
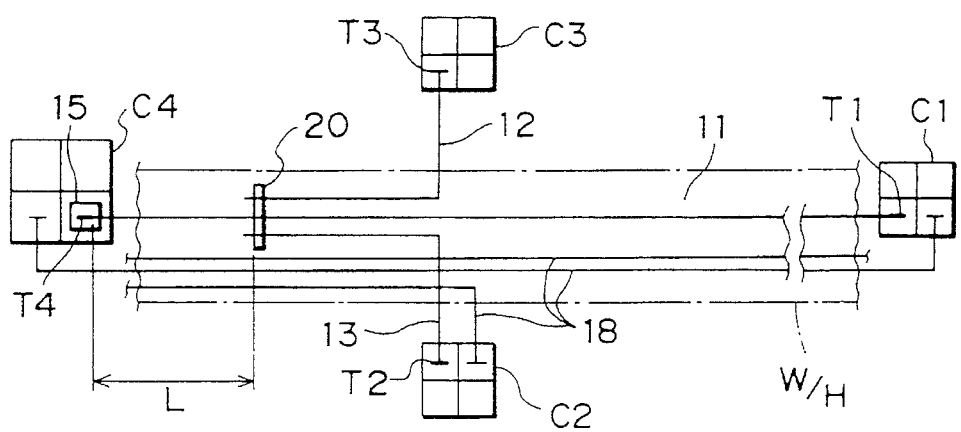
FIG. 8 is an assembly drawing of the wiring harness of FIG. 5.

When the wiring harness W/H in which the first, second and third wires 11, 12 and 13 and other wires 18 are bundled is assembled as shown in FIG. 8, the other end of the first wire 11 is connected to the connector C4 through the fourth terminal T4. Therefore, the splice portion 20 in which the first, second and third wires 11, 12 and 13 are spliced with each other is naturally bundled with other wires 18 at a location spaced the short distance L from the connector C4 such that the wiring harness is assembled. Namely, such a case does not happen that the splice portion 20 is erroneously bundled with other wires in a water immersion area.

When the wiring harness W/H is provided in the motor vehicle, the connector C4 is disposed at the cabin side X in the water nonimmersion area as shown in FIG. 5 and the splice portion 20 spaced the short distance L from the connector C4 is also disposed in the water nonimmersion area. Therefore, such a phenomenon can be prevented that the splice portion 20 is disposed in the water immersion area and water is sucked into the wiring harness from the splice portion 20.

Figure 9:
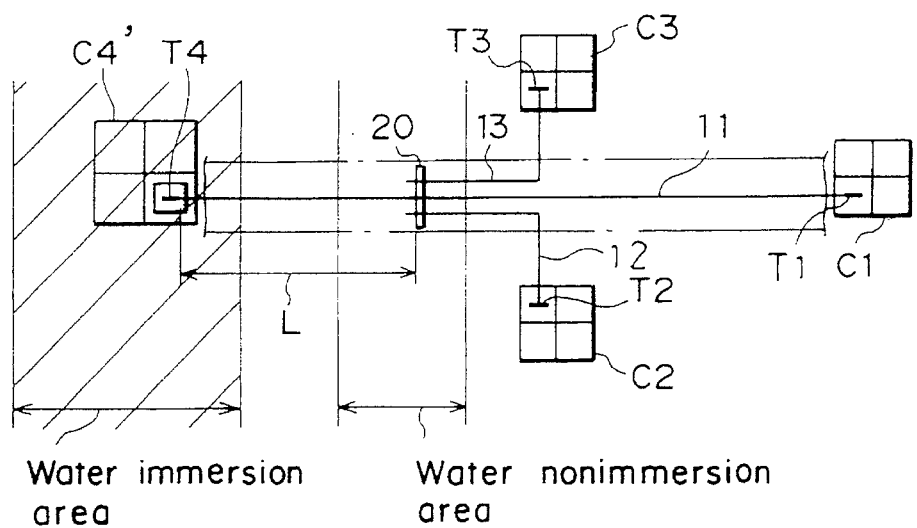
FIG. 9 is a schematic view showing layout of a wiring harness according to a second embodiment of the present invention.

In this embodiment, the connector C4 is disposed at the cabin side X in the water nonimmersion area and the splice portion 20 spaced the short distance L from the connector C4 is also disposed in the water nonimmersion area. However, when a connector C4' is disposed in the water immersion area but the splice portion 20 spaced the short distance L from the connector C4' is surely disposed in the water nonimmersion area as shown in FIG. 9, the connector C4' may be disposed in the water immersion area. Meanwhile, in this case, the connector C4' is preferably formed by a waterproof connector. Since the splice portion 20 is disposed in the water nonimmersion area, water is prevented from being sucked into the wiring harness from the splice portion 20.

As is clear from the foregoing description of the present invention, the terminal attached to the distal end of one of the spliced wires is mounted in the spare terminal pocket of the connector disposed surely in the water nonimmersion area and other wires are spliced with this wire at a portion of this wire, which is passed through the nonimmersion area.

Therefore, the splice portion is positively disposed in the water nonimmersion area.

Accordingly, even if the wiring harness including these spliced wires is passed through the water immersion area, the splice portion is not disposed in the water immersion area, so that water is prevented from being sucked into the wiring harness from the splice portion.

Figure 1:
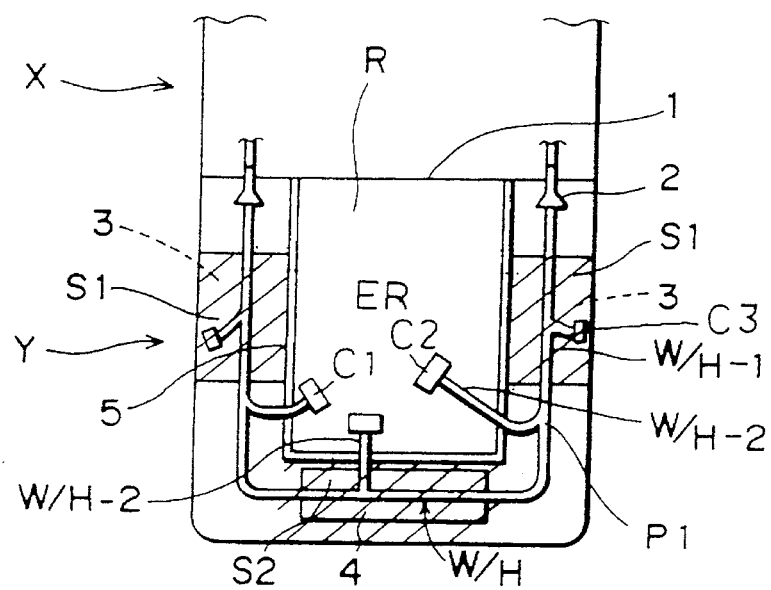
FIG. 1 is a schematic view showing a layout of a prior art wiring harness provided in water immersion areas of a motor vehicle (already referred to)
Figure 2:
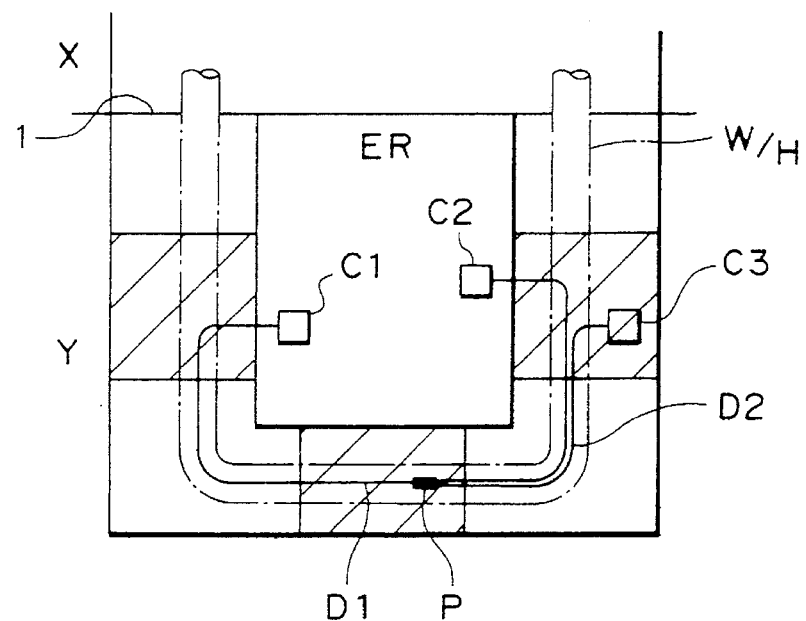
FIG. 2 is a schematic view indicative of a drawback of the prior art wiring harness of FIG. 1 (already referred to)
Figure 3:
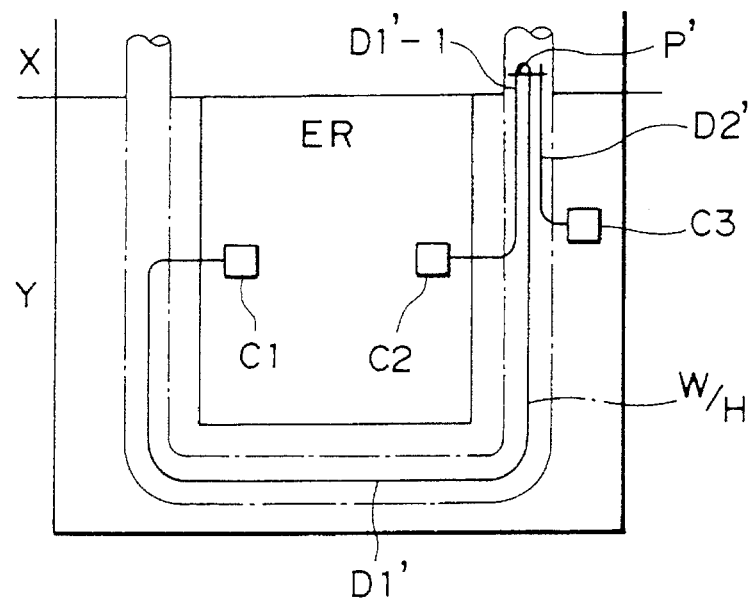
FIG. 3 is a schematic view showing a layout of a further prior art wiring harness which eliminates the drawback of the prior art wiring harness of FIG. 1 (already referred to)
Figure 4:
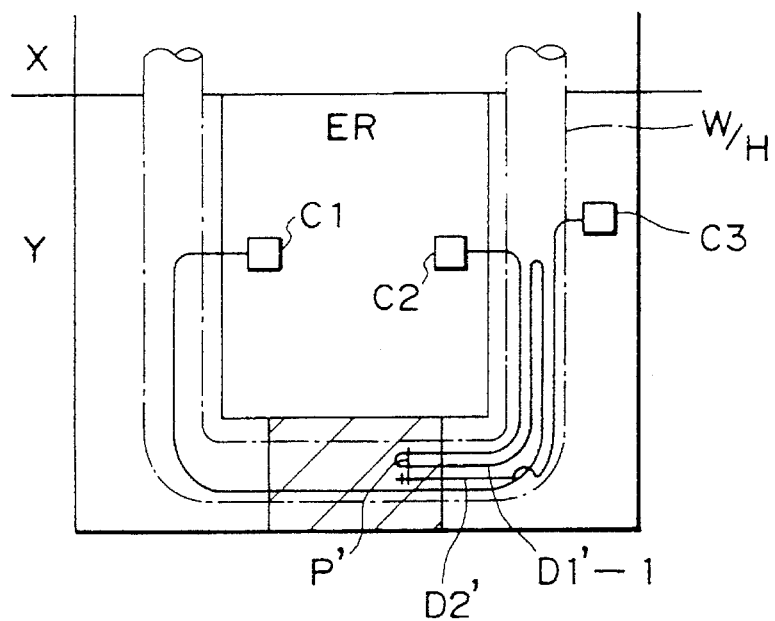
FIG. 4 is a schematic view showing a problem of the further prior art wiring harness of FIG. 3 (already referred to)

Meanwhile, the splice portion is disposed at the location spaced the predetermined short distance from the joint portion of the connector. Therefore, when the spliced wires and other wires are bundled so as to assemble the wiring harness W/H, such a phenomenon does not occur in which the wiring harness is assembled in a state where the splice portion is erroneously disposed in the water immersion area as in a known wiring harness employing a U-shaped portion of FIG. 3.

What is claimed is:

1. A waterproof construction of a wiring harness, in which a plurality of splicing wires, passed through a water immersion area likely to be subjected to water immersion in a motor vehicle and spliced with each other, are bundled with other wires, comprising:

a first terminal which is attached to a distal end of one of the splicing wires;

the one of the splicing wires being spliced with a remainder of the splicing wires;

a first connector which is disposed at a predetermined position such that the terminal is mounted in a spare terminal pocket of the connector;

second and third terminals attached to distal ends of remaining splicing wires;

second and third connectors disposed such that the second terminal is mounted in the second connector and the third terminal is mounted in the third connector; and a splice portion in which the one of the splicing wires is spliced with the remainder of the splicing wires at a location spaced a predetermined distance from the predetermined position of the first connector and disposed in a water nonimmersion area not subject to water immersion such that the splice portion is disposed in the water nonimmersion area at all times.

2. A waterproof construction as claimed in claim 1, wherein the connector is disposed at a cabin side of the motor vehicle in the water nonimmersion area and the splice portion is provided at a location disposed adjacent to a joint portion of the connector and in the water nonimmersion area.

3. A waterproof construction of an automotive wiring harness, in which a plurality of splicing wires, passed through a water immersion area likely to be subjected to water immersion in a motor vehicle and spliced with each other, are bundled with other wires and prevented from being located in the water immersion area during manufacture, comprising:

a first terminal which is attached to a distal end of one of the splicing wires;

the one of the splicing wires being spliced with a remainder of the splicing wires;

a first connector which is disposed at a predetermined position such that the terminal is mounted in a spare terminal pocket of the connector;

second and third terminals attached to distal ends of remaining splicing wires;

second and third connectors disposed such that the second terminal is mounted in the second connector and the third terminal is mounted in the third connector; and a splice portion in which the one of the splicing wires is spliced with the remainder of the splicing wires at a location spaced a predetermined distance from the predetermined position of the first connector and disposed in a water nonimmersion area not subject to water immersion, to thereby prevent the wiring harness from being installed in the vehicle in such fashion that said splice portion is disposed in the water immersion area.

4. A waterproof construction as claimed in claim 3, wherein the connector is disposed at a cabin side of the motor vehicle in the water nonimmersion area and the splice portion is provided at a location disposed adjacent to a joint portion of the connector and in the water nonimmersion area.

\* \* \* \* \*